March 31. 1925.  1,531,934

A. A. HELLBAUM ET AL

VEGETABLE CUTTER

Filed June 23, 1924    2 Sheets-Sheet 1

Inventors
Fred E. Hellbaum
Arthur A Hellbaum
Fred Hockman.
By Herbert E. Smith
Attorney March 31, 1925.
A. A. HELLBAUM ET AL
1,531,934

VEGETABLE CUTTER

Filed June 23, 1924
2 Sheets-Sheet 2

Inventors
Fred E. Hellbaum
Arthur A. Hellbaum
Fred Hockman
By Herbert E. Smith
Attorney Patented Mar. 31, 1925.

1,531,934

UNITED STATES PATENT OFFICE.

ARTHUR A. HELLBAUM, FRED E. HELLBAUM, AND FRED HOCKMAN, OF ENDICOTT, WASHINGTON.

VEGETABLE CUTTER.

Application filed June 23, 1924. Serial No. 721,651.

*To all whom it may concern:*

Be it known that we, ARTHUR A. HELLBAUM, and FRED E. HELLBAUM, citizens of the United States of America, and FRED HOCKMAN, citizen of Germany (first papers applied for in January, 1924, declaring intention to become a citizen of the United States of America), residing at Endicott, Whitman County, and State of Washington, have invented certain new and useful Improvements in Vegetable Cutters, of which the following is a specification.

The present invention relates to improvements in vegetable cutters of the rotary type, especially adapted for household use in slicing cabbage, potatoes, beans and similar vegetables, and for certain kinds of fruit.

The invention embodies a rotary cutting head or disk having cutting blades carried thereby and set at an angle to insure a draw cut or slice movement on the vegetable, which is fed thereby by means of a selected hopper. A set of interchangeable feed hoppers for use with various kinds of vegetables or fruit is designed for use in connection with the device as will be described.

The device of the invention is preferably hand operated and portable, and is provided with a receptacle to receive the cut vegetables or fruit after slicing or cutting in the machine. The primary object of the invention is the provision of a device of this character that is compact in its arrangement, simple in construction and operation, and composed of a minimum number of parts or elements, thus rendering it inexpensive in cost of production and not likely to require repair or readjustment. The invention consists in certain novel combinations and arrangements of parts as will hereinafter be more fully pointed out and claimed.

In the accompanying drawings one complete example of the physical embodiment of the invention is illustrated, wherein the parts are combined and arranged in accordance with the best mode thus far devised for the practical application of the principles of the invention.

In carrying out the invention a casing or housing 1 is utilized, which is of proper size and shaped to conform to the enclosed operating parts of the portable, hand operated machine. Screw clamps as 2 are provided by means of which the device may be detachably secured for service to a table top T or to other suitable support, and in the lower portion of the housing or casing is located a rectangular tray or drawer 3 to receive the cut vegetables, and a handle 4 is provided for manipulating the tray.

Figure 5:
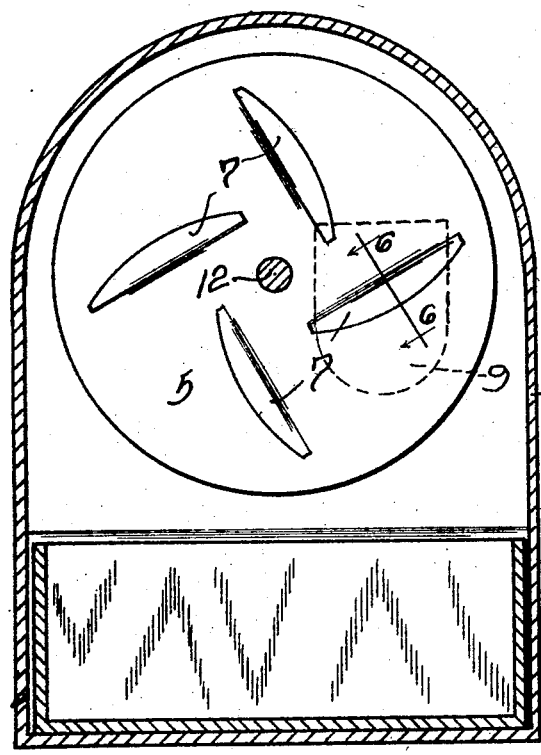
Figure 5 is an enlarged transverse sectional view through the casing showing the cutting blades on the face of the rotary head or disk.

The rotary cutter head 5 is a circular disk preferably fashioned from sheet metal and provided with a reinforcing annular flange 6 to insure stability of movement. The cutter head carries a series of cutting blades 7, four being shown in the drawings. These blades are preferably stamped or struck up from the metal of the cutter head and are beveled at 8 to form a cutting edge, which as shown in Figure 5 extends tangentially with relation to the axis of the cutter head to insure a draw or slicing cut on the vegetable as the cutter head rotates, anticlockwise.

Figure 6:
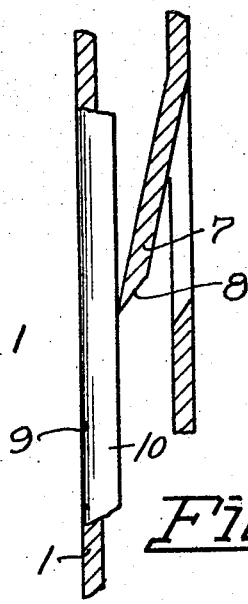
Figure 6 is an enlarged detail view illustrating the relation of one of the cutter blades to the edge wall of the feed aperture of the casing.

At one side of the central axis of the cutter head is located in the front wall of the housing a feed aperture or opening 9 having a smooth and uniform flanged edge or wall 10 at the inner side of the housing for co-action with the cutting edge of the blades as best illustrated in Figure 6, The cutter head is disposed upon a horizontal axis and its central hub 11 is rotatable with its operating shaft 12 which is journaled in bearings 13 and 14 respectively at the front and rear of the housing or casing. A spring is coiled about the shaft and interposed between the hub 11 and the fixed washer 16 on the shaft, and it will be apparent that the spring has a tendency to urge the cutter head, through its hub, and shaft, and the cutting blades on the head toward the front. This action of the spring provides a resilient means for holding the cutting blades in operative relation to the guide flange or wall 10 around the feed opening 9. The movement of the shaft longitudinally is limited by an adjusting or set screw 17 alined with the axis of the shaft and threaded into the bearing plate 18 on the front of the machine.

The cutter is rotated, manually, from the crank handle 19 on a crank shaft 20, and power is transmitted from the crank shaft to the cutter shaft through a pair of pinions 21 and 22 the former on the crank shaft and the latter on the cutter shaft, the parts being geared to rotate the cutter head at high speed.

A bearing brace or bar 23 is provided for the crank shaft 20 which is located adjacent to and parallel with the cutter shaft, and a rear bearing is provided at 24 for the crank shaft. This bearing brace is notched in its upper edge to receive the cutter shaft which passes transversely therethrough.

Figure 1:
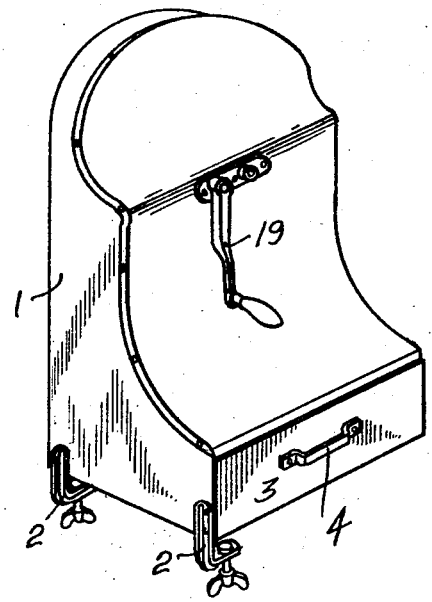
Figure 1 is a perspective view of a device embodying the invention showing the means for attaching it to a table or other suitable support.
Figure 2:
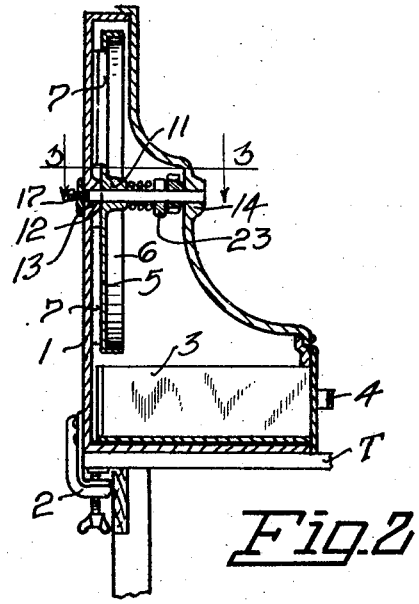
Figure 2 is a vertical central sectional view of the device as at line 2—2 of Figure 3.
Figure 3:
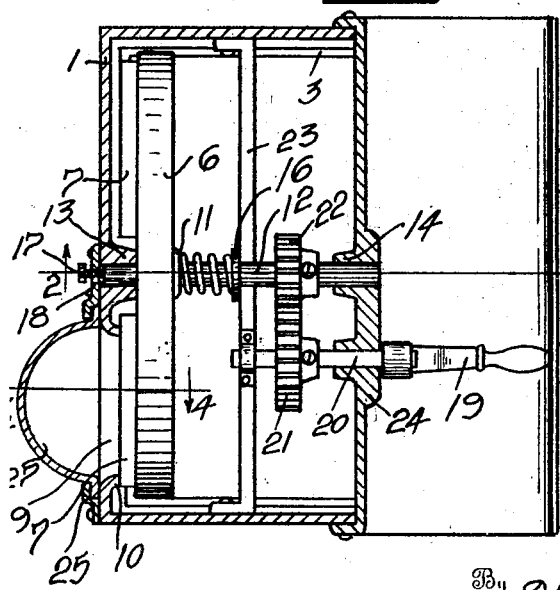
Figure 3 is a horizontal sectional view at line 3—3 of Figure 2.
Figure 4:
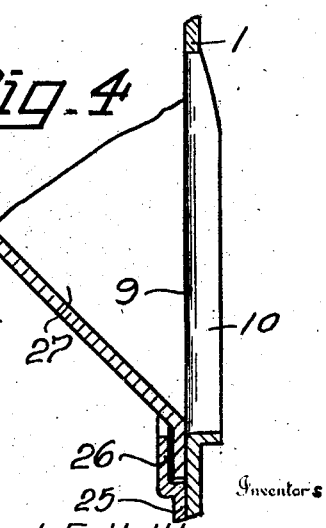
Figure 4 is an enlarged detail sectional view showing the relation of one of the interchangeable feed hoppers to the feed opening or aperture of the casing, as at line 4—4 of Figure 3.
Figure 7:
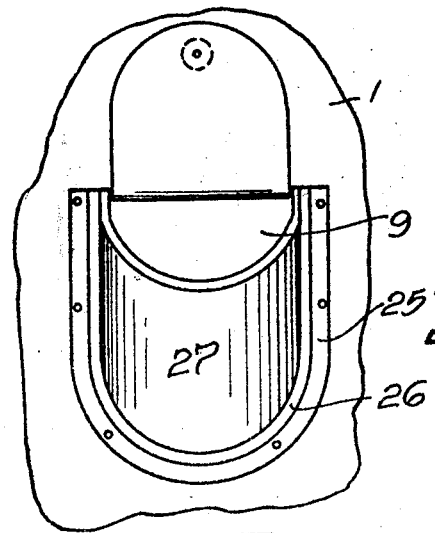
Figure 7 is a front view of a feed hopper in place, for large vegetables, as cabbage.
Figure 8:
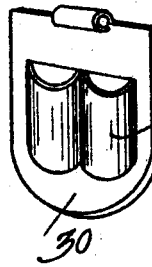
Figure 8 is a perspective view of a feed device for cucumbers and similar vegetables.
Figure 9:
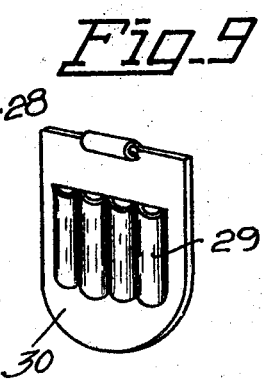
Figure 9 is a similar view of another feed hopper for a different type of vegetable, as string beans.

The feed aperture 9 in the front plate of the casing is somewhat U-shape, and around this aperture is attached a U-shaped bracket plate 25 having an inner flange 26 to provide a groove formation for the reception of a selected feed hopper. In Figures 4 and 7 a hopper 27 is shown adapted especially for cabbage; 28 in Figure 8 and 29 in Figure 9 are respectively for cucumbers and string beans. All of the hoppers have a plate as 30 adapted to slip in the bracket back of the U-shaped flange 26, and by means of this plate and flange arrangement the hopper is detachably fixed in position for feeding the vegetables therethrough. When a selected hopper is attached to the front of the housing the vegetable may be fed therethrough and pushed into the aperture. The vegetable may be held in the left hand for instance, and the crank 19 is turned by the right hand in a clock-wise direction, which action revolves the cutter head in anti-clockwise direction. As the vegetable is pressed by hand into the aperture 9 the blades of the rotary cutter successively slice or cut off the end of the vegetable protruding into the aperture, and the slices fall into the tray or receptacle, after which the receptacle may be withdrawn and the sliced vegetable disposed of as desired.

The thickness of the slice to be cut off may be governed by pressure on the material fed into the aperture 9. Thus if only a slight pressure is exerted by the left hand a thin slice will result, while to secure a thicker slice, greater pressure is applied. The application of greater pressure results in forcing the cutter head, against pressure of spring 15, away from the guide wall 10, and the thickness of the slice is governed by the distance between the guide wall and the disk. The spring holds the cutter head and its blades in operative relation to the guide wall at all times regardless of the distance between them.

Having thus fully described the invention, what is claimed herein is—

1. The combination with a vegetable cutter having a housing and feed aperture therein, of an interior guide wall about said aperture, a longitudinally movable cutter shaft journaled in the housing, adjustable means supported in the housing for limiting its movement and means for urging the shaft toward said limiting means, a cutter head on the shaft, cutting blades carried by said head for co-action with said guide wall and means for operating said shaft.

2. In a vegetable cutter the combination of a housing having an aperture and an interior guide wall about the aperture, a cutter shaft journaled and longitudinally movable in the housing and a set screw for limiting such movement, a cutter head on the shaft and cutting blades thereon for co-action with said guide wall, a spring for maintaining the cutter head in operative relation to said guide wall, and means for rotating said shaft.

In testimony whereof we affix our signatures.

ARTHUR A. HELLBAUM.
FRED E. HELLBAUM.
FRED HOCKMAN.